United States Patent [19]

Niwaya et al.

[11] Patent Number: 4,582,410
[45] Date of Patent: Apr. 15, 1986

[54] TRIPOD TYPE SLAVE UNIT

[75] Inventors: Keiichi Niwaya, Chigasaki, Japan

[73] Assignee: Asanuma Camera Mechanical Laboratory & Co., Ltd., Tokyo Japan

[21] Appl. No.: 739,147

[22] Filed: May 30, 1985

[51] Int. Cl.$^4$ .................. G03B 15/02; G03B 29/00
[52] U.S. Cl. ..................... 354/293; 354/424;
354/81; 354/131; 250/214 SF
[58] Field of Search ............... 354/81, 82, 131, 293,
354/424; 250/214 SF; 362/3, 4, 8, 11, 12;
352/243; 248/27.1, 550

[56] References Cited

U.S. PATENT DOCUMENTS

| 1,936,595 | 11/1933 | Goddard | 354/424 |
|---|---|---|---|
| 2,408,764 | 10/1946 | Edgerton | 354/424 |
| 2,773,732 | 12/1956 | Roberts et al. | 354/131 X |
| 3,742,835 | 7/1973 | Bahnsen | 354/81 |
| 3,805,281 | 4/1974 | Narita et al. | 354/81 |
| 3,917,944 | 11/1975 | Eisenberger et al. | 354/424 X |
| 4,030,114 | 6/1977 | Telfer | 354/81 |
| 4,045,808 | 8/1977 | King | 354/293 X |
| 4,290,685 | 9/1981 | Ban | 354/293 X |

Primary Examiner—William B. Perkey

[57] ABSTRACT

A tripod type slave unit comprises a shoe type mount for carrying detachably a mounting leg for strobo device and the like on a portion of a tripod device detachable to an accessory mount of a camera, a control terminal connected to a switching terminal for strobo device and the like carried on the shoe type mount, and a switching circuit connected between both terminals of said control terminal to shortcircuit both the terminals temporarily by means of a photosensor for detecting a leading edge of a flash of a main light source.

1 Claim, 13 Drawing Figures

FIG. 2
FIG. 3
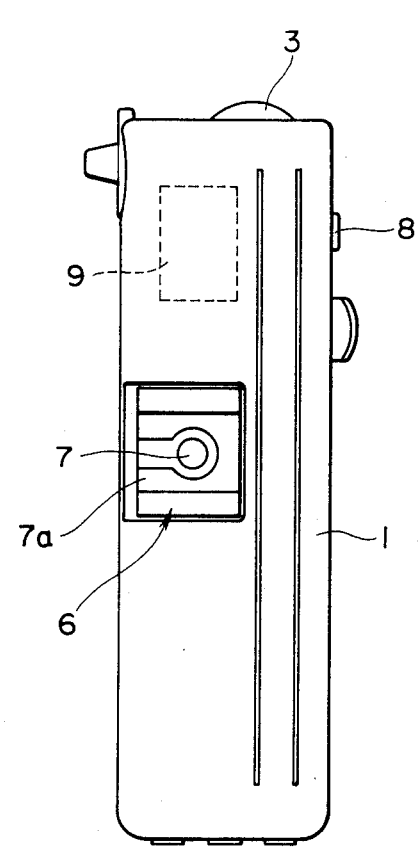
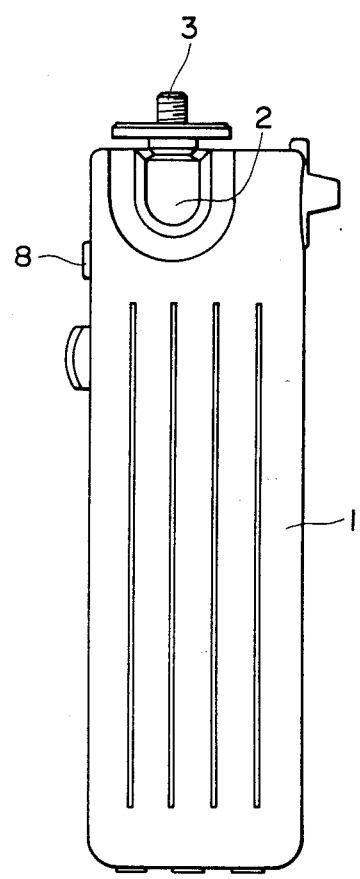

FIG. 12
FIG. 13
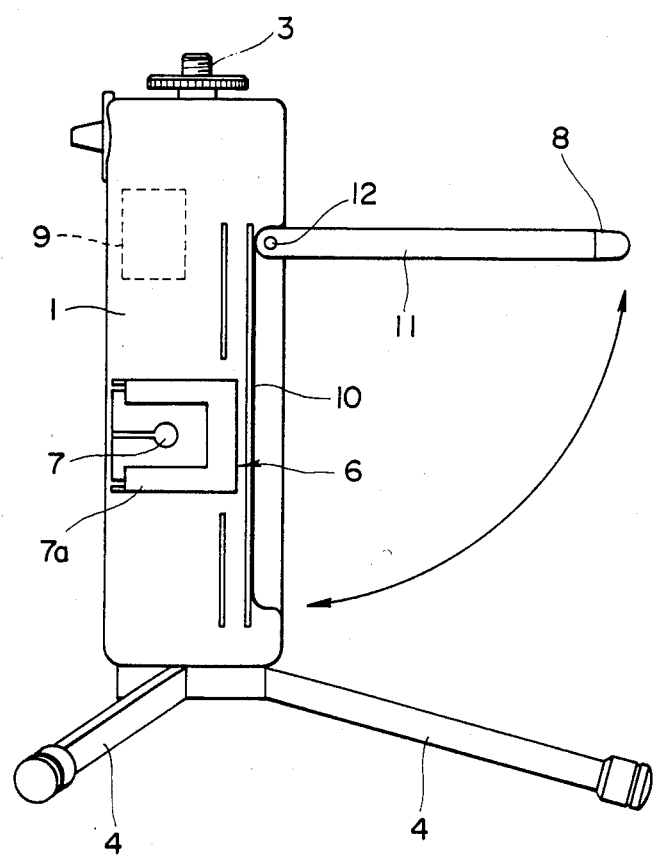
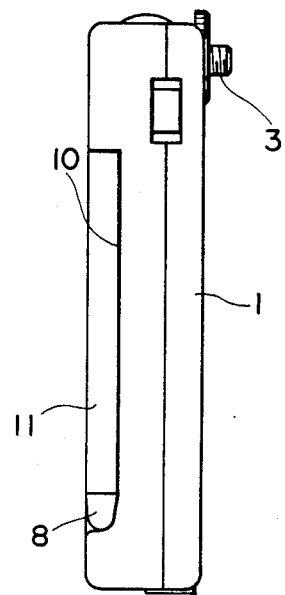

TRIPOD TYPE SLAVE UNIT

BACKGROUND OF THE INVENTION

This invention relates to an improvement of a slave unit for flash light source lamp in photographic shooting, and is to provide a tripod type slave unit for flashing a sub-light source in tuning with the main light source by wireless.

Heretofore, slave units have been used for driving strobo device or flash bulb lighting device in tuning with a main light source by wireless in order to measure an increased quantity of the main light source in the photographic shooting.

However, the slave units of this kind form a single structure as an accessory of the camera, and are inconvenient for carrying and the like in addition to the other camera accessories.

This invention has been conceived in view of the foregoing circumstances, and its purpose is to provide a slave unit in which a mechanism of the slave unit is built in a part of the tripod that is one of the camera accessories, and being integrated into the tripod.

Therefore, this invention relates to a tripod type slave unit comprising a shoe type mount for carrying detachably a mounting leg for strobo device and the like on a portion of a tripod device detachable to an accessory mount of a camera, a control terminal connected to a switching terminal for strobo device and the like carried on the shoe type mount, and a switching circuit connected between both terminals of said control terminal to shortcircuit both the terminals temporarily by means of a photosensor for detecting a leading edge of a flash of a main light source.

BRIEF SUMMARY

The tripod type slave unit of the foregoing construction is to carry a strobo device that becomes a main light source to the tripod or to mount the camera that becomes in integral unit, or to use by pressing a shutter of the camera ordinarily in the condition in which the tripod is set in a light projecting zone of the main light source and the strobo device that becomes an auxiliary light source is carried on the shoe type mount of the tripod, and thus, a switching circuit is turned ON as the photosensor detects the leading edge of the flash of the strobo device that is the main light source lighting simultaneous with the pressing of the shutter of the camera, and both terminals of the control terminal is temporarily shortcircuited and therefore, the strobo device at the auxiliary light source side is lighted on by means of the switching terminal connected to the control terminal to effect the flashing.

DETAILED DESCRIPTION

The drawings show an embodiment of the tripod type slave unit of this invention;

FIG. 2 is a left side view of the condition where the leg members are housed;

FIG. 3 is a right side view thereof;

FIG. 12 is a right side view of the condition where the tiltable arm shown in the other embodiment of this invention is set upright; and FIG. 13 is an elevation of the condition where the tiltable arm is housed.

Figure 1:
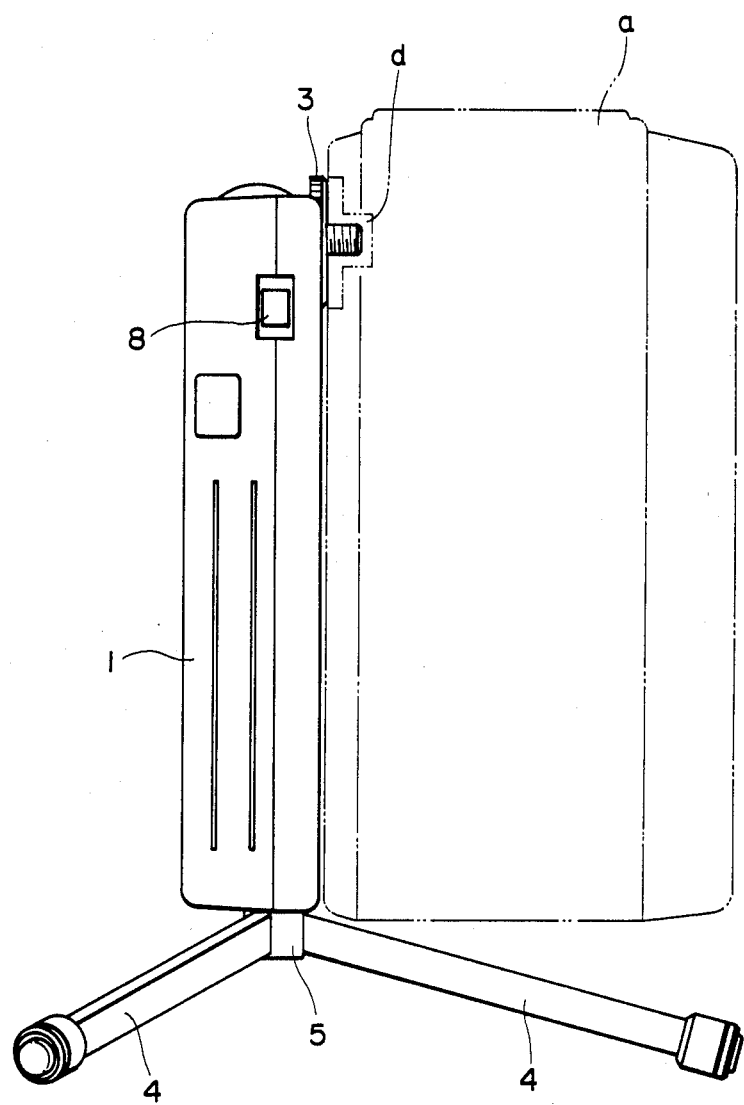
FIG. 1 is an elevation in which leg members are expanded.
Figure 4:
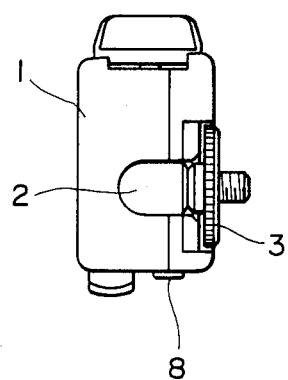
FIG. 4 is a plan.
Figure 5:
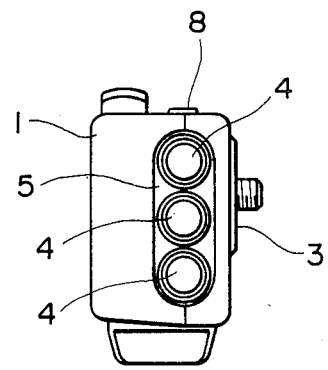
FIG. 5 is a bottom surface view.
Figure 6:
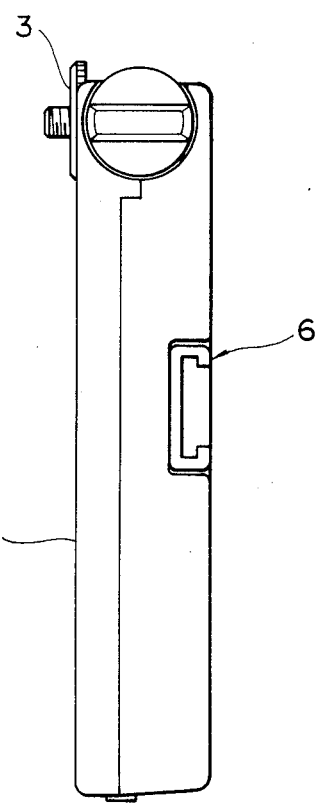
FIG. 6 is a back view.

An embodiment of the tripod type slave unit of this invention will be described by referring to FIG. 1 through FIG. 6. Reference numeral 1 denotes a rectangular shell body having a length and a width corresponding to almost a bottom surface of a small size camera and a width of the other side smaller than said width, and a camera platform 3 is pivotally fixed to one end of the shell body which is screwed and detachable to a threaded hole of an accessory mount d of a camera a tiltable in 90 degrees to one side by means of a hinge mechanism such as a spherical type bearing 2 and the like, and leg members 4, 4, 4 are extendable from the other end of the shell body 1, and each inner end portion of the leg members 4, 4, 4 is pivotally fixed in radial direction tiltable to a sliding block 5 capable of sliding in axial direction in the shell body 1, and thus, the shell body 1 is uprightly supported by expanding the leg members in three directions. Also, numeral 6 denotes a shoe type mount for carrying a mounting leg of the strobo device and the like fixed to the one side of the shell body 1 opposite in the tilting direction of the camera platform 3, and the shoe type mount 6 forms integral type control terminals 7, 7a, and is fixed by exposing a receptor portion of a photosensor 8 consisting of photodiodes at front side of the shell body 1, and a switching circuit 9 for shortcircuiting at the leading edge of the light receiving signal of the photosensor 8 is interposed and connected between the control terminals 7 and 7a.

Figure 7:
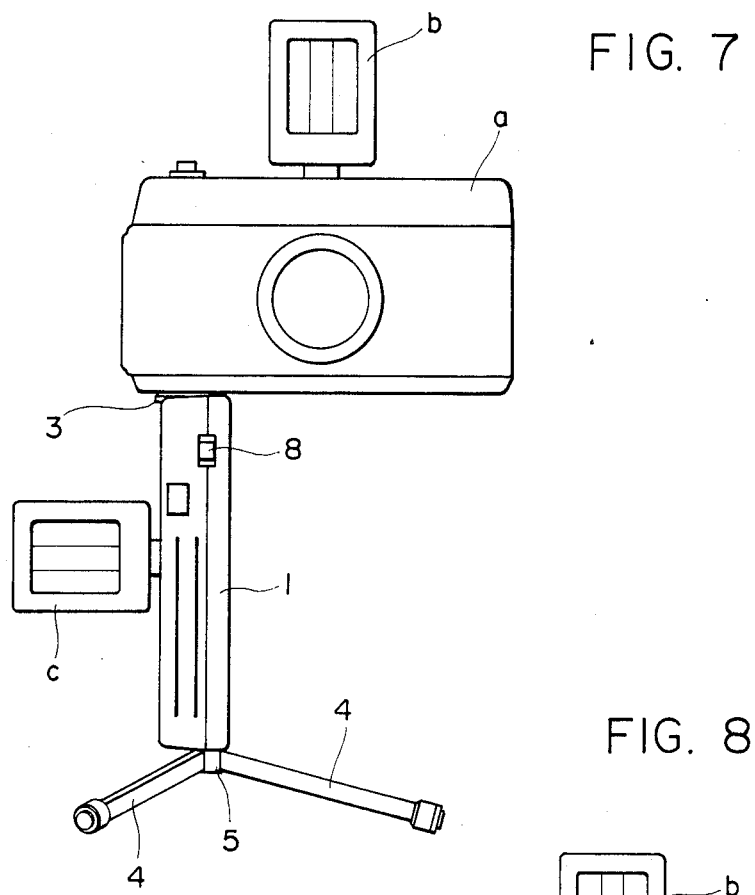
FIG. 7 through FIG. 9 are almost elevations showing examples of use.
Figure 8:
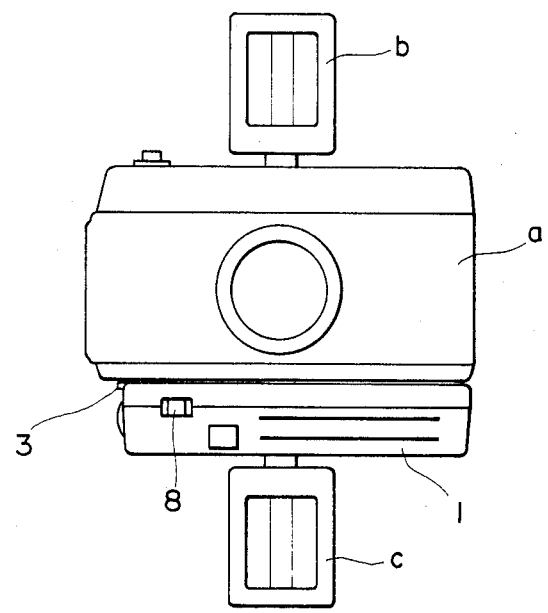
Figure 9:
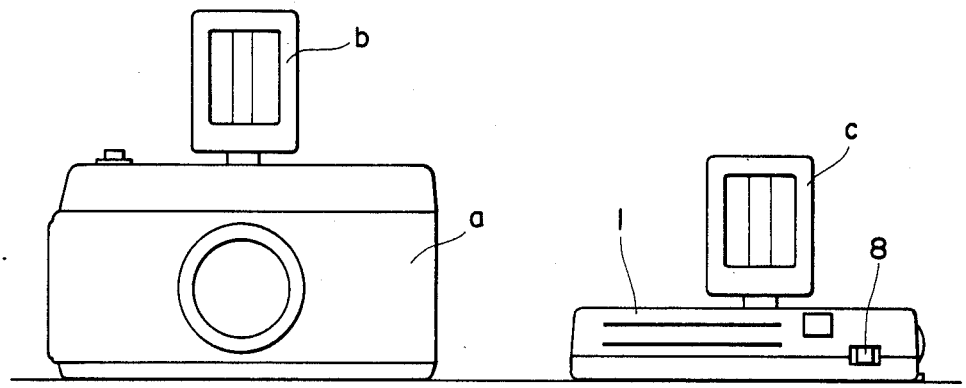
Figure 10:
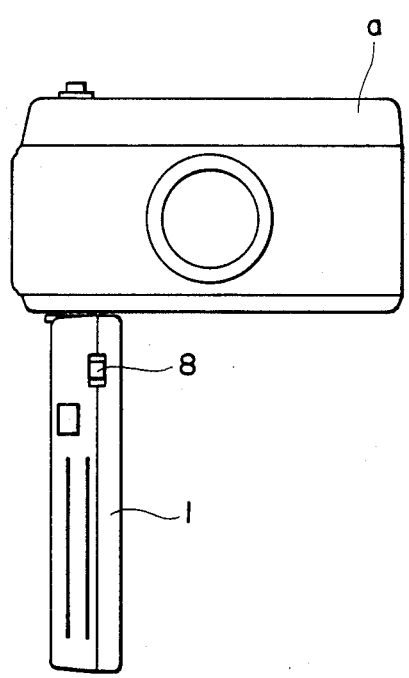
FIGS. 10 and 11 are almost elevations showing an example of not used.
Figure 11:
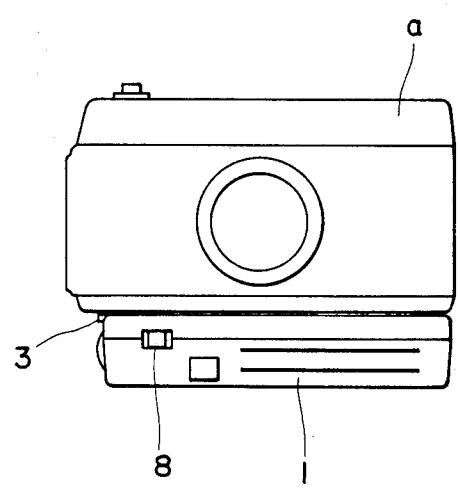

The foregoing tripod type slave unit having the foregoing construction is used in such ways, the use of a stand as shown in FIG. 7 in which the shell body 1 is set upright by the leg members 4, 4, 4 extruded and expanded, and the camera a is mounted by positioning the camera platform 3 in the axial direction of the shell body 1, and the strobo device b form main light source is carried, and the strobo device c for auxiliary light is carried on the shoe type mount of the slave unit side, and the portable use as shown in FIG. 8 in which the leg members 4, 4, 4 are housed inside of the shell body 1, the camera platform 3 is tilted sideways, namely, it is installed on the bottom surface of the camera a, or the separate use as shown in FIG. 9 in which the slave unit is separated from the camera a and is used by being positioned in the flash light projection zone of the strobo device b for main light source; namely the slave unit can be used meeting to various shooting conditions. (By the way, FIGS. 10 and 11 show an example of using it as a grip when not used, and an example used as a camera base simply on the floor.)

Namely, the tripod type slave unit of this invention is such that a switching circuit 9 is interposed between switching terminals of the strobo c for auxiliary light source (in this embodiment, a conventional structure is shown in which it is provided on the bottom surface of the mounting legs in correspondence to the control terminals 7, 7a of the shoe type mount 6) by means of the control terminals 7, 7a, and because the switching circuit 9 is of a cableless system to be shortcircuited and driven by the photosensor 8, the photosensor 8 can be set in a range of detecting the flash of the main light source without relationship of the position of the camera a.

FIGS. 12 and 13 show another embodiment of this invention, and the mounting position of the light receiving portion of the photosensor 8 of the first embodiment is changed. Namely, in this embodiment, the light receiving portion 8a of the photosensor 8 is provided at one end of a tiltable arm 11 that can be housed in a housing concave portion 10 formed at a front edge of the shell body 1 provided with the shoe type mount 6, and the other end is swivellably fixed by means of a pin shaft 12 and the tiltable arm 11 is tiltable at a front position of the shell body 1, and said light receiving portion 8a is exposed to the end of the tiltable arm 11, and the control terminals 7, 7a of the shoe type mount 6 are shortcircuited at the leading edge of the light receiving signal of the photosensor 8 by means of the inside switching circuit 9.

Namely, in the slave unit of the foregoing construction, the camera is mounted on the camera platform 3, and when the flash of the strobo device for main light source mounted on the camera is received, the tiltable arm 11 can be pulled forward of the strobo device for main light source, so that the flash can be directly irradiated to the photosensor 8, and the response properties of the strobo device for auxiliary light source mounted on the shoe type mount 6 at the slave unit side is improved.

The effect of this invention is as follows.

As the tripod type slave unit of this invention is an integral unit of the small size tripod and the slave unit, and it can be used for various methods according to the shooting conditions of photography along with the upright operation of the tripod, and there is no inconvenience of carrying the tripod and the slave unit separately, and also, it is possible to carry it being fixed to the bottom portion of the camera when not used, or the operation of the camera is possible in such a condition and practical effects of this invention are extremely great.

What is claimed is:

1. A tripod type slave unit comprising a shoe type mount for carrying a mounting leg for strobo device and the like detachably to a portion of a tripod device detachable to an accessory mount of a camera, a control terminal for connection to a switching terminal of the strobo device carried on the shoe type mount, and a switching circuit connected between both terminals of the control terminal and shortcircuits both the terminals temporarily by means of a photosensor for detecting the leading edge of flash of a main light source.

* * * * *